United States Patent
Bill

(10) Patent No.: US 9,022,183 B2
(45) Date of Patent: May 5, 2015

(54) SELF-CENTERING WET CLUTCH OR BRAKE PLATE

(71) Applicant: Deere & Company, Moline, IL (US)

(72) Inventor: Randall K. Bill, Cedar Falls, IA (US)

(73) Assignee: Deere and Company, Moline, IL (US)

( * ) Notice: Subject to any disclaimer, the term of this patent is extended or adjusted under 35 U.S.C. 154(b) by 20 days.

(21) Appl. No.: 13/951,775

(22) Filed: Jul. 26, 2013

(65) Prior Publication Data

US 2015/0027826 A1 Jan. 29, 2015

(51) Int. Cl.
*F16D 65/12* (2006.01)
*F16D 69/00* (2006.01)

(52) U.S. Cl.
CPC ........ *F16D 65/127* (2013.01); *F16D 2069/004* (2013.01)

(58) Field of Classification Search
CPC .............. F16D 2069/04; F16D 65/127; F16D 2065/1332; F16D 2065/789
USPC .................................................. 188/218 XL
See application file for complete search history.

(56) References Cited

U.S. PATENT DOCUMENTS

| | | | |
|---|---|---|---|
| 3,071,210 A | * | 1/1963 | Wrigley et al. ............. 188/18 A |
| 3,972,400 A | | 8/1976 | Howells |
| 4,287,978 A | | 9/1981 | Staub, Jr. |
| 5,671,835 A | * | 9/1997 | Tanaka et al. ............. 192/107 R |
| 6,454,072 B1 | * | 9/2002 | Merkel et al. ............. 192/70.12 |
| 7,455,162 B2 | * | 11/2008 | Epple et al. ............. 192/113.36 |
| 8,424,664 B2 | * | 4/2013 | Fabricius et al. ........ 192/113.36 |
| 2008/0041675 A1 | * | 2/2008 | Baumgartner et al. . 188/218 XL |

FOREIGN PATENT DOCUMENTS

| | | |
|---|---|---|
| DE | 102006009565 A1 | 9/2006 |
| DE | 102010021900 A1 | 12/2011 |
| DE | 102012014811 A1 | 1/2014 |

OTHER PUBLICATIONS

German Search Report, mailed Nov. 21, 2014.

* cited by examiner

*Primary Examiner* — Anna Momper
(74) *Attorney, Agent, or Firm* — Taft Stettinius & Hollister LLP; Stephen F. Rost

(57) ABSTRACT

The present disclosure provides a brake disk for a brake assembly. The disk includes an annular body having an inner diameter and an outer diameter. The disk also includes friction material coupled to the body and substantially covering at least one side thereof. The friction material forms a first diameter and a second diameter, where the first diameter is smaller than the second diameter. The disk further includes a groove pattern defined in the friction material. The groove pattern includes a plurality of grooves, where each of the plurality of grooves includes an inlet defined at the first diameter and an outlet defined at the second diameter. The inlet defines a first width and the outlet defines a second width such that the first width is greater than the second width.

20 Claims, 5 Drawing Sheets

SELF-CENTERING WET CLUTCH OR BRAKE PLATE

FIELD OF THE INVENTION

The present disclosure relates to a clutch or brake plate, and in particular to a wet clutch or brake plate having a groove pattern for hydraulically centering in a disengaged position and maintaining capacity in an engaged position.

BACKGROUND OF THE INVENTION

Wet brake systems have been implemented into a rear axle design of a machine or tractor for several years. In these systems, one or more brake disks is disposed between reaction plates. The disk rotates at axle speed and pressure can be applied to the disk by a piston to control the speed of the machine or tractor.

In the wet brake system, the one or more brake disks can be partially submersed in a bath of oil so that as the disk rotates oil flow is induced through a groove defined in the disk. A conventional brake disk can be formed of an inner metal core with a paper-like material disposed on both sides of the core. The groove in the brake disk can part of an overall groove pattern defined in the paper of the disk. The groove pattern can have a depth equal to or less than the overall thickness of the paper. As the brake disk rotates, the oil can flow from an inner diameter of the disk towards the other diameter thereof. As the oil flows from the inner diameter to the outer diameter, heat can be transferred and removed from the brake disk. In effect, heat that is generated when the brake disk is applied can be substantially removed to protect the integrity of the brake disk in the system.

Unfortunately, while many conventional brake disks have groove patterns that can remove heat therefrom, the disks have other limitations. For instance, referring to FIG. 1, a conventional brake disk 100 includes an outer layer of paper 102. A square-cut groove pattern 104 is defined in the paper layer 102 and includes a plurality of horizontal grooves 112 and a plurality of vertical grooves 114. As shown, some of the plurality of horizontal grooves 112 and vertical grooves 114 extend from an inner diameter 106 to an outer diameter 108 of the disk 100. However, there are several horizontal and vertical grooves that do not extend between the inner diameter 106 and outer diameter 108. For instance, horizontal groove 118 and vertical groove 116 extend from one location at the outer diameter 108 to a second location at the outer diameter 108.

As the brake disk rotates, oil is able to flow from the inner diameter 106 to the outer diameter 108 through only a limited number of grooves. In this manner, the brake disk 100 includes some grooves that are optimally positioned to receive and transfer oil through the disk and other grooves that are not optimally positioned to achieve the same. As a result, the brake disk 100 may include zones of entrapped air where oil or other fluid cannot flow or there is reduced flow. In cases of entrapped air, there is a lack of heat transfer through the disk thereby forming hot pockets on the disk and possible damage or defects to the disk due to heat.

Another problem with the brake disk of FIG. 1 is its lack of a separation or centering feature. During a braking event, the brake disk 100 is engaged by separator plates that are disposed on both sides of the disk. As the brake is released, the piston releases pressure against the separator plates. However, the brake disk 100 does not include a separation feature for hydraulically separating the disk 100 from the separator plates. Thus, the brake disk 100 can drag with the separator plates and cause a reduction in power performance of the machine or tractor.

To overcome drag, some conventional brake disks include a separation feature. In FIG. 2, for example, a conventional brake disk 200 is shown that includes a metal core and a paper layer 202. The paper layer 202 defines a square-cut groove pattern 204 between the inner diameter 206 and outer diameter 208 of the disk 200. The square-cut groove pattern 204 defines a plurality of squares 210 formed by a first groove 212 and a second groove 214. The first groove 212 and second groove 214 are perpendicular to one another. Similar to the groove pattern 104 of the first convention disk 100, the second groove pattern 204 of disk 200 also includes some grooves that intersect both the inner diameter 206 and outer diameter 208 and other grooves that only intersect the outer diameter 208. As a result, the brake disk 200 has certain areas that are better at transferring heat from the disk and others that are not.

The brake disk 200 also includes six slots 216. Each slot 216 forms an inlet portion 218 at the inner diameter 206 and includes a dead-end or closed portion 220 near the outer diameter 208. The dead-end or closed portion 220 does not intersect the outer diameter 208, so oil or other fluid flowing through the slot 216 builds therein. Thus, when the brake is released, the buildup of oil or fluid in each slot 216 causes the brake disk 200 to hydraulically separate from the separator plates. The dead-end or closed portion 220 of each slot 216, however, causes a lack of heat transfer and prevents the brake disk 200 from cooling.

Therefore, it would be desirable to provide a brake disk with a groove pattern that can effectively promote heat transfer and hydraulically separate the brake disk from separator plates.

SUMMARY

In an exemplary embodiment of the present disclosure, a brake disk is provided for a brake assembly. The disk includes an annular body having an inner diameter and an outer diameter. The disk also includes friction material coupled to the body and substantially covering at least one side thereof. The friction material forms a first diameter and a second diameter, where the first diameter is smaller than the second diameter. The disk further includes a groove pattern defined in the friction material. The groove pattern includes a plurality of grooves, where each of the plurality of grooves includes an inlet defined at the first diameter and an outlet defined at the second diameter. The inlet defines a first width and the outlet defines a second width such that the first width is greater than the second width.

In one aspect, the groove pattern can form a plurality of substantially V-shaped grooves between the first diameter and second diameter. Each of the substantially V-shaped groove intersects with two or more other substantially V-shaped grooves. In another aspect, the second diameter can be approximately aligned with the outer diameter. Alternatively, the second diameter can be equal to or less than the outer diameter. In a related aspect, the width of each groove is tapered from the inlet to the outlet. The first width, for example, can be approximately twice the second width.

In a different aspect, the friction material can form a plurality of substantially triangular and diamond-shaped portions between the plurality of grooves. Related thereto, at least one side of the plurality of substantially triangular portions can coincide with either the first diameter or second diameter. Moreover, the plurality of substantially diamond-shaped portions can be spaced from the first diameter and second diameter. In a further aspect, the friction material can substantially cover both sides of the body and the groove pattern can be defined in the friction material on both sides of the body.

In another embodiment of the present disclosure, a disk assembly includes a piston, a first plate and a second plate spaced from one another, and a disk disposed between the first and second plates. The piston is disposed adjacent to one of the first and second plates. In addition, the disk includes a body having an inner diameter and an outer diameter, friction material coupled to the body and at least partially covering both sides thereof, and a groove pattern defined in the friction material. The friction material forms a first diameter and a second diameter, where the first diameter is smaller than the second diameter. Moreover, the groove pattern includes a plurality of grooves where each of the plurality of grooves includes an inlet defined at the first diameter and an outlet defined at the second diameter. The inlet defines a first width and the outlet defines a second width, where the first width is greater than the second width.

In one aspect of this embodiment, the groove pattern can form a plurality of substantially V-shaped grooves between the first diameter and second diameter. Each of the substantially V-shaped grooves can intersect with two or more other substantially V-shaped grooves. In another aspect, the second diameter can be approximately aligned with the outer diameter. In a further aspect, the width of each groove can be tapered from the inlet to the outlet. In one instance, the first width can be approximately twice the second width.

In a different aspect, the friction material can form a plurality of substantially triangular and diamond-shaped portions between the plurality of grooves. For example, at least one side of the plurality of substantially triangular portions can coincide with either the first diameter or second diameter. Moreover, the plurality of substantially diamond-shaped portions can be spaced from the first diameter and second diameter.

In a related embodiment, the brake assembly can include an engaged condition and a disengaged condition. In the engaged condition, the piston is in contact with one of the first and second plates and the disk is in contact with both plates. In the disengaged condition, the disk is spaced between both plates.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The present disclosure provides embodiments that can be related to any pack of plates for a brake system or clutch system. For instance, the disk can be part of a brake pack where each brake disk is separated by separator plates. Alternatively, the disk can form part of a clutch pack where the disk is a clutch plate that is separated by reaction plates. For purposes of this disclosure, the terms "disk" and "plate" are interchangeable. Likewise, the terms "separator plate" and "reaction plate" are interchangeable.

Figure 3:
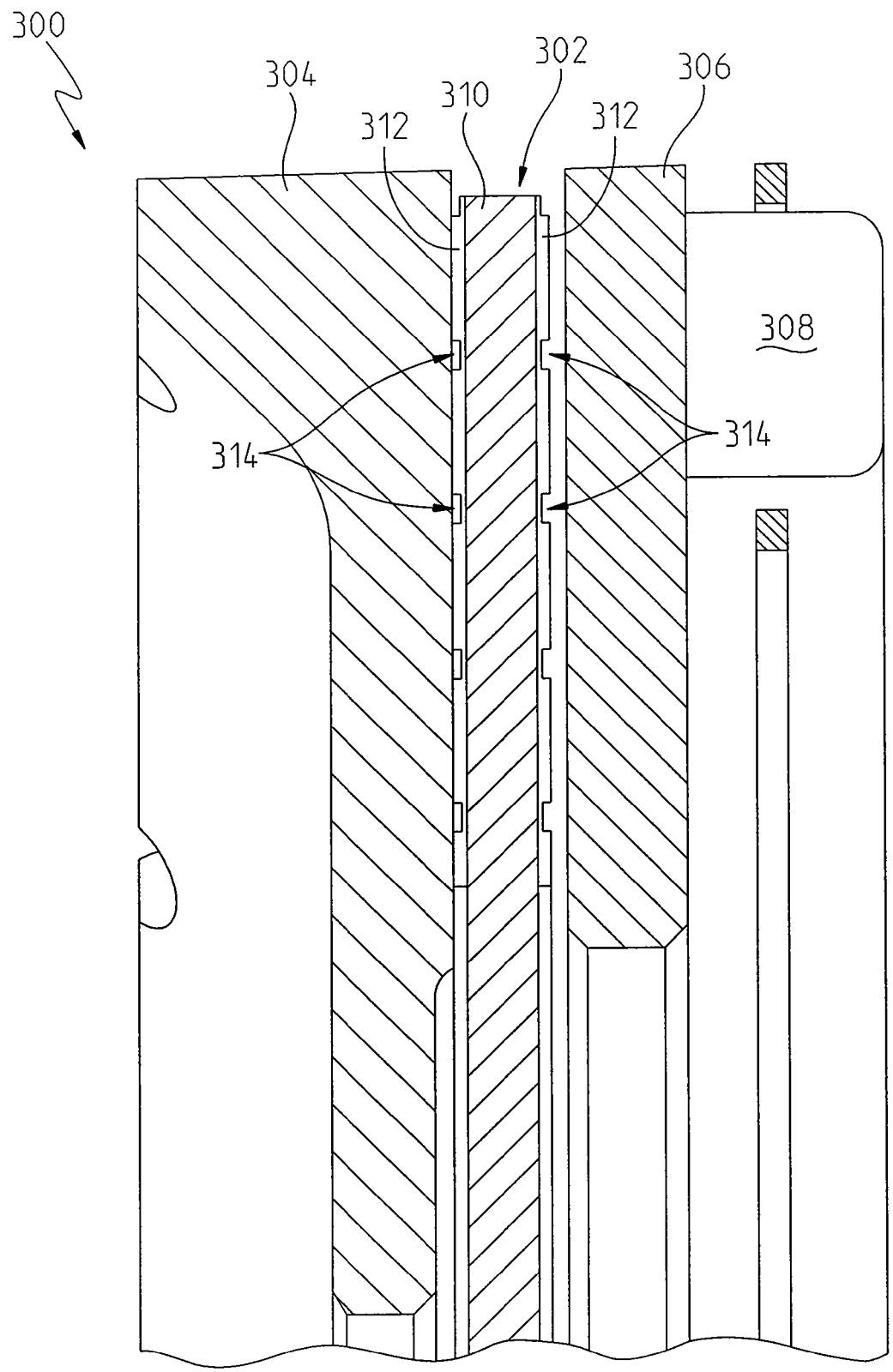
FIG. 3 is schematic of an exemplary brake assembly.

Referring to FIG. 3, an exemplary embodiment of a brake assembly 300 is shown. The brake assembly 300 includes a brake disk 302 disposed between a first separator plate 304 and a second separator plate 306. The brake disk 302 can include an inner metal core 310 and a paper layer 312 on both sides of the core 310. A groove pattern 314 is defined in the paper layer 312 to promote heat transfer from the brake disk 302.

The brake disk 302, first separator plate 304 and second separator plate 306 can form a brake disk pack. A piston 308 is disposed adjacent to the second separator plate 306. When the brake system is engaged, the piston 308 can be hydraulically applied against the second separator plate 306. The second separator plate 306 is pressed against the brake disk 302, thereby engaging the brake disk 302 with both separator plates.

Figure 4:
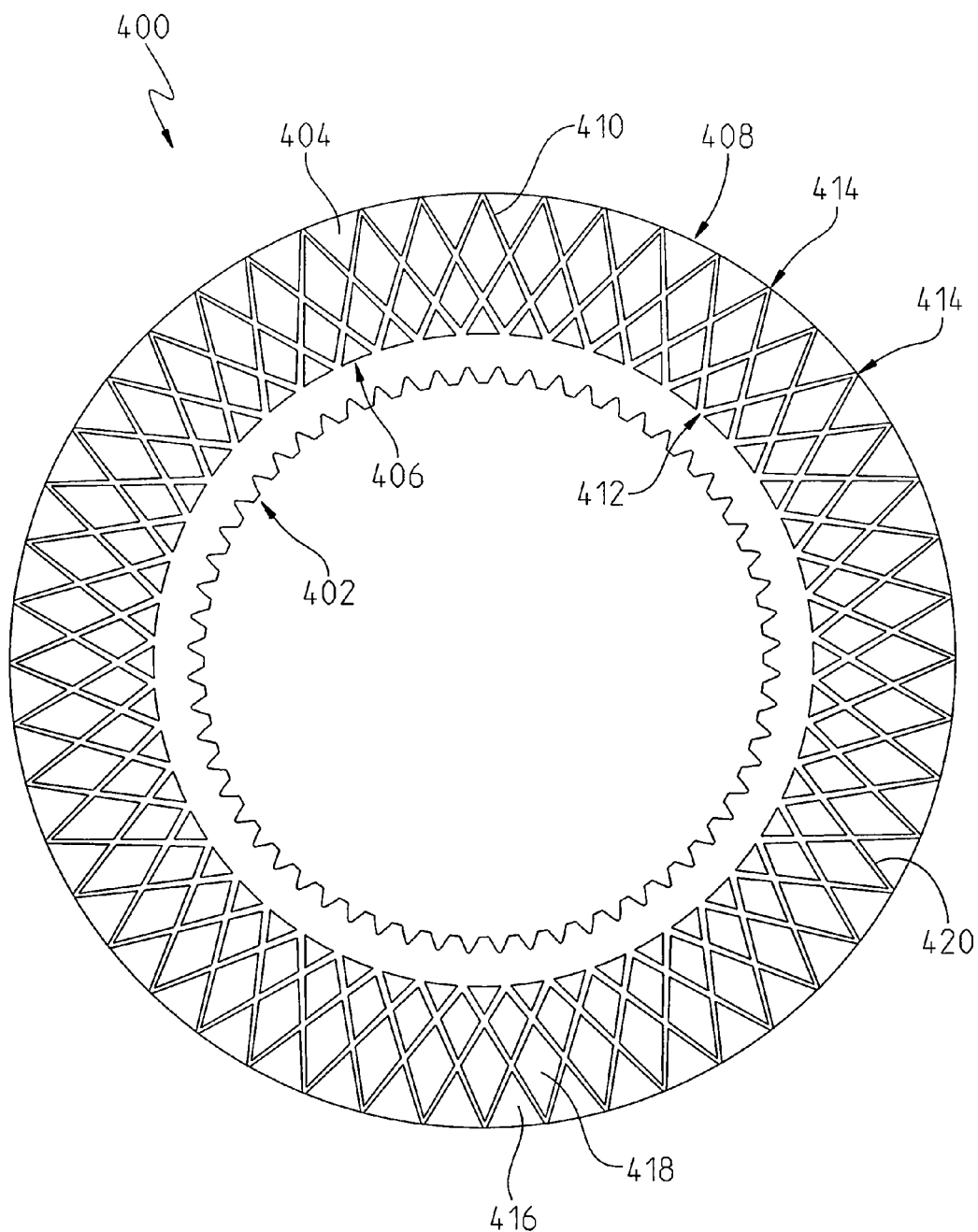
FIG. 4 is a front view of an exemplary embodiment of a brake disk having tapered grooves.

In FIG. 4, an exemplary embodiment of a brake disk 400 is shown. The brake disk 400 can include a plurality of internal splines 402 for engaging a shaft, hub, drum or portion of a rear axle. Similar to the brake disk 302 of FIG. 3, the brake disk 400 can include a metal core formed of steel or other material. A layer of paper 404 can be adhered or coupled to either or both sides of the core. The paper can be any type of friction material, such as Borg Warner 4501 or Borg Warner 4429 friction material. The size of the brake disk 400 can be dependent on the application it is used for. In one, non-limiting example, the core can be approximately 2-4 mm thick and the paper layer can be 0.5-1.0 mm thick.

Figure 1:
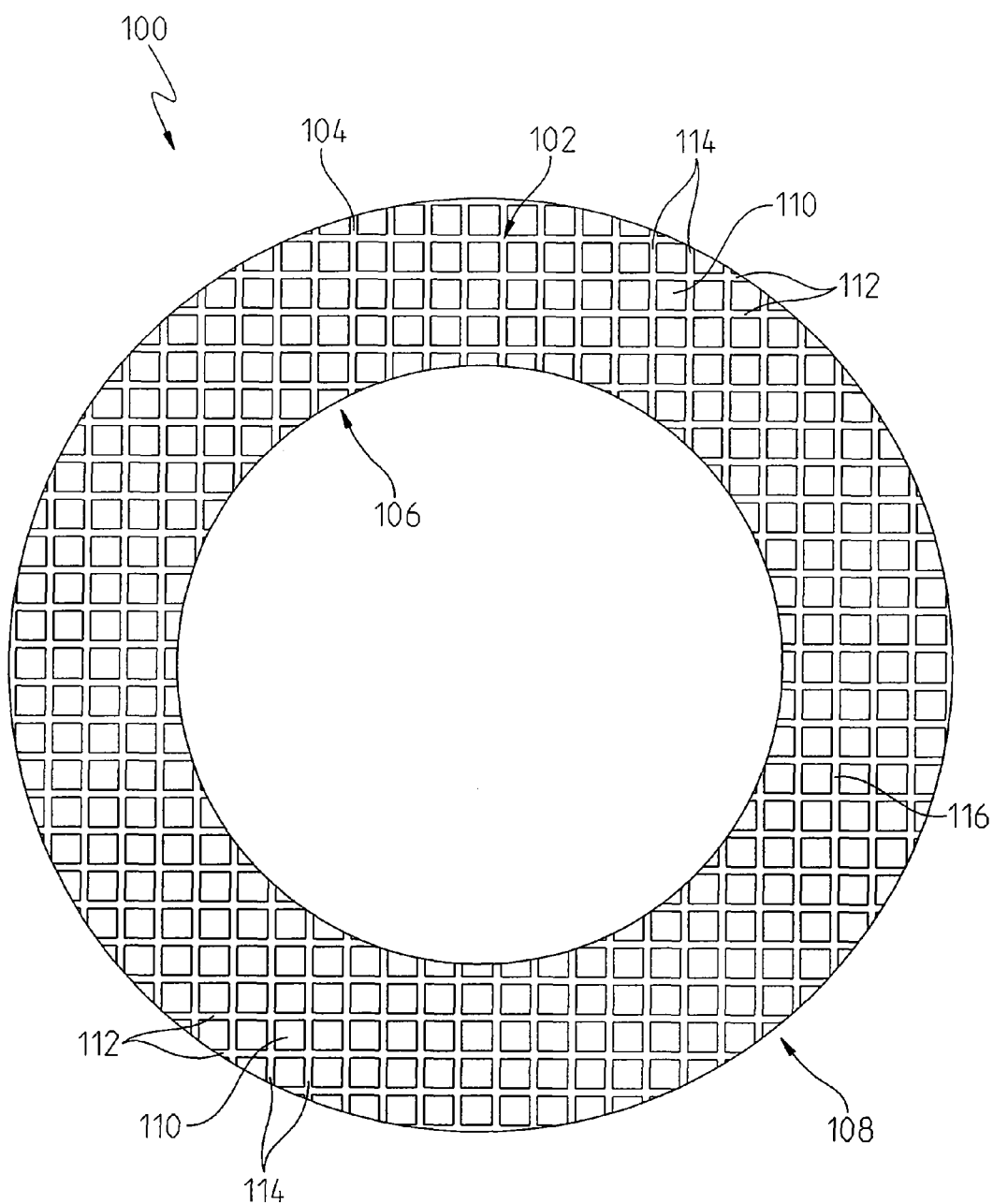
FIG. 1 is a schematic of first conventional embodiment of a brake disk.
Figure 2:
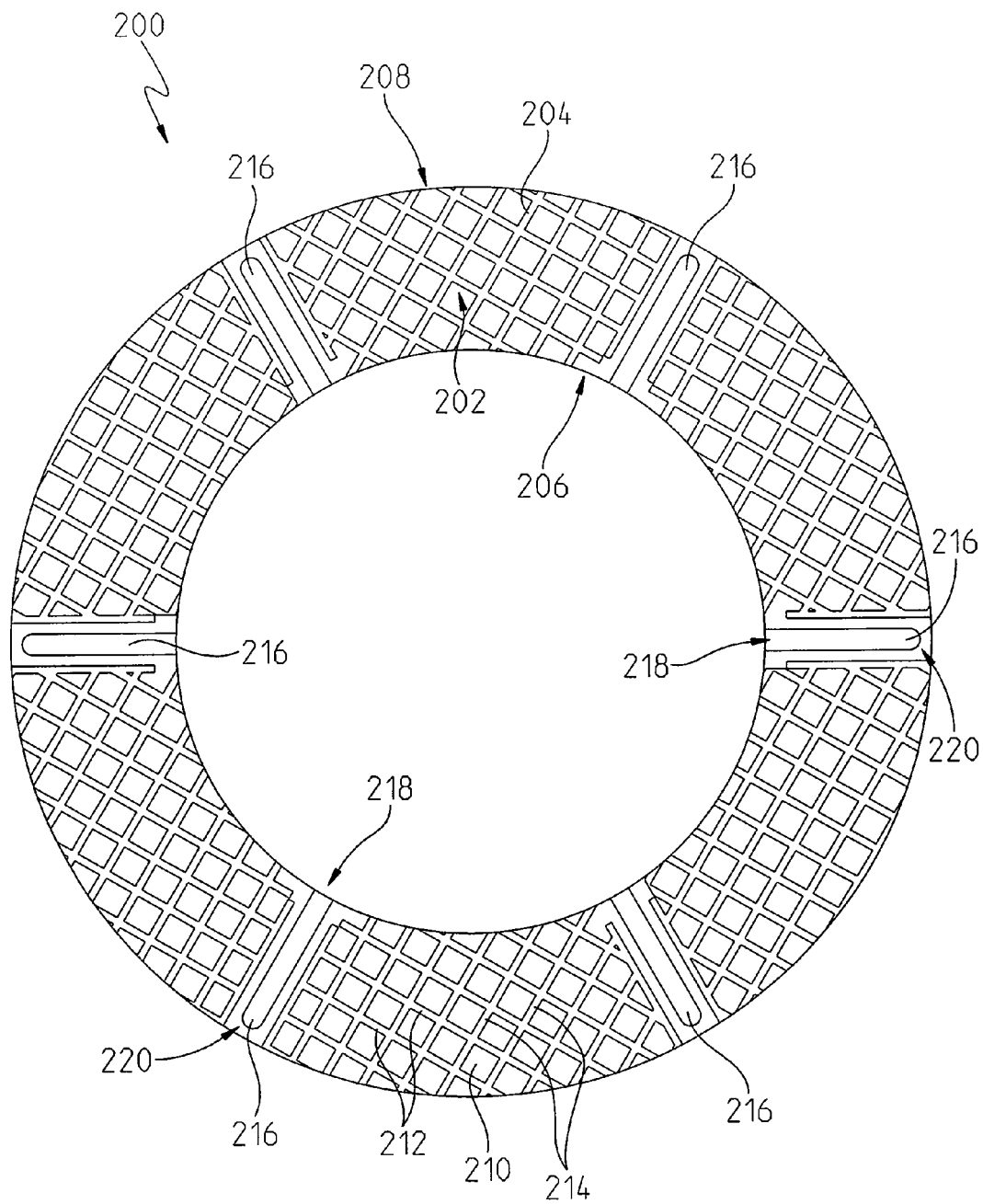
FIG. 2 is a schematic of second conventional embodiment of a brake disk.

The paper layer 404 of the brake disk 400 includes an inner diameter 406 and an outer diameter 408. A groove pattern 410 is formed in the paper layer 404 as shown. The groove pattern 410 is formed by a plurality of grooves 420. As shown in FIG. 4, each of the plurality of grooves 420 of the groove pattern 410 extends from the inner diameter 406 to the outer diameter 408. In this arrangement, each groove 420 defines an inlet 412 at the inner diameter 406 and an outlet 414 at the outer diameter 408. Thus, as the brake disk 400 rotates, oil or other fluid can flow through each of the plurality of grooves 420 from the inlet 412 to the outlet 414. Unlike the conventional brake disks shown in FIGS. 1 and 2, the groove pattern 410 of FIG. 4 is radially-symmetrical and facilitates heat transfer through every groove 420. As a result, each groove can be substantially filled with oil and there is less likely of a chance for air to be entrapped in any one groove.

The friction material (e.g., paper layer 404) is separated by the groove pattern 410 into a plurality of substantially triangular-shaped portions 416 and a plurality of substantially diamond-shaped portions 418. The plurality of substantially triangular-shaped portions 416 are disposed near the inner diameter 406 and outer diameter 408. In particular, at least one side of the plurality of substantially triangular-shaped portions 416 forms either the inner diameter 406 or outer diameter 408 of the paper layer 404. The plurality of diamond-shaped portions 418 are spaced from the inner diameter 406 and outer diameter 408.

Figure 5:
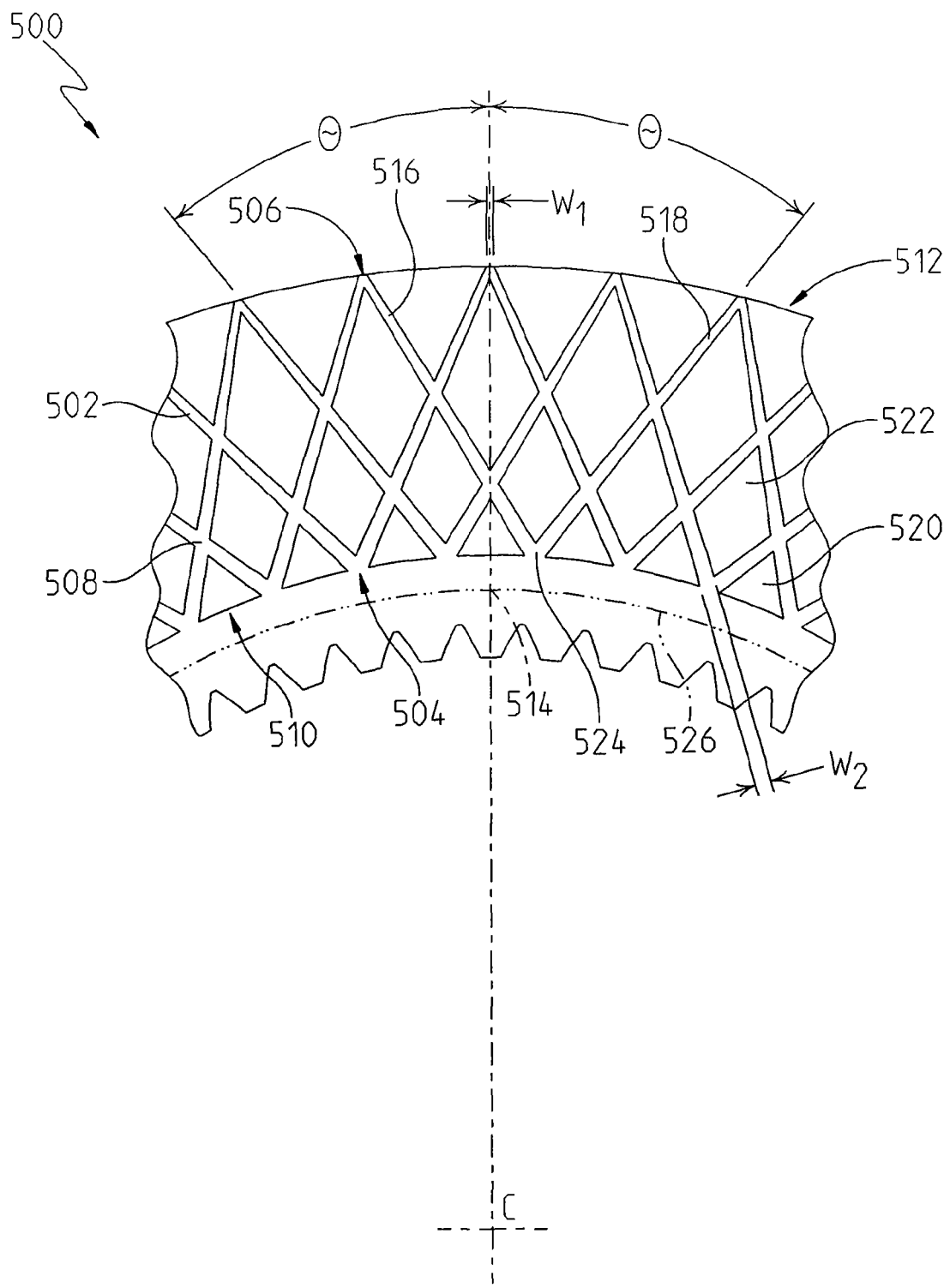
FIG. 5 is an enlarged view of a portion of the brake disk of FIG. 4.

The groove pattern 410 of FIG. 4 is further illustrated in FIG. 5. In FIG. 5, a portion 500 of the brake disk 400 is shown. Here, a plurality of grooves 502 correspond with the plurality of grooves 420 shown in FIG. 4. Each groove 502 includes an inlet 504 and an outlet 506 so oil or other fluid can flow therebetween. At the inlet 504, two grooves 502 intersect at point 524. A first groove 516 and a second groove 518 form a substantially V-shaped groove pattern. Each groove is disposed at an angle θ relative to an axis 528 that passes through a midpoint 514 and a center point, C, of the disk 400. The midpoint 514 lies along an inner arc having a diameter smaller than both the inner diameter 510 and outer diameter 512.

As also shown, the plurality of grooves 502 intersect with one another at different intersection points 508 to form a substantially cross-hatching design. As such, the groove pattern formed by the plurality of grooves 502 forms a plurality of substantially triangular shaped portions 520 of friction material and a plurality of substantially diamond-shaped portions 522 of friction material. The substantially triangular-shaped portions 520 and diamond-shaped portions 524 are similar to the substantially triangular-shaped portions 416 and diamond-shaped portions 418, respectfully, shown in FIG. 4.

The groove pattern 410 of the brake disk 400 also includes a self-centering or separation feature to reduce brake drag or windage. Windage is the inefficiency in the brake system due to drag between the brake disk and separator plates. In a rear axle, for example, it is desirable for windage to be reduced or substantially eliminated to achieve near maximum energy capacity required to rotate the system at any given speed through a speed range. To achieve the self-centering or separation feature, each groove 502 narrows from the inlet 504 to the outlet 506 as shown in FIG. 5. The groove 502 can be tapered from the inlet 504 to the outlet 506.

In FIG. 5, the groove 502 can have a first width, $W_1$, at the outlet 506 and a second width, $W_2$, at the inlet 504, where the first width $W_1$ is smaller than the second width $W_2$. For example, in one embodiment, the ratio of the first width $W_1$ to the second width $W_2$ can be approximately 1:2 or less. In another embodiment, the ratio can be approximately 1:2.5 or less. In a further embodiment, the ratio can be approximately 1:5 or less. Other arrangements are possible such that the angle and groove width are scalable to the size of the disk.

In the embodiment of FIG. 5, the brake disk rotates causing centrifugal acceleration to force oil through the plurality of grooves 502. With each groove 502 narrowly tapered from the inlet 504 to the outlet 506, oil remains in each groove and can overfill the groove thereby causing an axial force to move the brake disk away from the separator plates. In effect, the tapered grooves achieve the self-centering or separating feature for the brake disk so that energy is not consumed by rotating the axle at different speeds. In particular, the oil can cause the brake disk to be substantially centrally disposed between the separator plates, thereby reducing brake drag and increasing energy capacity and brake disk durability.

The groove pattern 410 of the brake disk 400 therefore can achieve the desired amount of heat transfer for the brake assembly, which improves the durability of the system. Moreover, oil remains in the tapered grooves so that the brake disk 400 can self-center or separate from the adjacent separator plates in the system. As a result, the brake disk 400 can advantageously achieve desired levels of energy efficiency and brake performance by reducing brake drag and windage.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A brake disk for a brake assembly, comprising:
an annular body having an inner diameter and an outer diameter;
a friction material coupled to the body and substantially covering at least one side thereof, the friction material forming a first diameter and a second diameter, where the first diameter is smaller than the second diameter; and
a groove pattern defined in the friction material, the groove pattern including a plurality of grooves;
wherein, each of the plurality of grooves includes an inlet defined at the first diameter and an outlet defined at the second diameter, and at least one of the plurality of grooves intersects with another of the plurality of grooves at a location between the first diameter and the second diameter;
further wherein, the inlet defines a first width and the outlet defines a second width, the first width being greater than the second width, and the width of each of the plurality of grooves decreasingly tapers from the first width to the second width.

2. The brake disk of claim 1, wherein the groove pattern forms a plurality of substantially V-shaped grooves between the first diameter and second diameter.

3. The brake disk of claim 2, wherein each substantially V-shaped groove intersects with two or more other substantially V-shaped grooves.

4. The brake disk of claim 1, wherein the second diameter is approximately aligned with the outer diameter.

5. The brake disk of claim 1, wherein the width of each groove is tapered from the inlet to the outlet.

6. The brake disk of claim 1, wherein the friction material forms a plurality of substantially triangular and diamond-shaped portions between the plurality of grooves.

7. The brake disk of claim 6, wherein:
at least one side of the plurality of substantially triangular portions coincides with either the first diameter or second diameter; and
the plurality of substantially diamond-shaped portions is spaced from the first diameter and second diameter.

8. The brake disk of claim 6, wherein:
each of the plurality of triangular portions is formed at the first diameter and the second diameter; and
each of the plurality of diamond-shaped portions are formed between the plurality of triangular portions and spaced from the first and second diameters.

9. The brake disk of claim 1, wherein each of the plurality of grooves extends from the inner diameter to the outer diameter.

10. The brake disk of claim 1, wherein:
the friction material substantially covers both sides of the body; and
the groove pattern is defined in the friction material on both sides of the body.

11. A disk assembly, comprising:
a piston;

a first plate and a second plate spaced from one another, where the piston is disposed adjacent to one of the first and second plates; and a disk disposed between the first and second plates, the disk including:

a body having an inner diameter and an outer diameter;

a friction material coupled to the body and at least partially covering both sides thereof, the friction material forming a first diameter and a second diameter, where the first diameter is smaller than the second diameter; and a groove pattern defined in the friction material, the groove pattern including a plurality of grooves where at least one of the plurality of grooves intersects with another of the plurality of grooves at a location between the first diameter and the second diameter;

wherein, each of the plurality of grooves includes an inlet defined at the first diameter and an outlet defined at the second diameter;

further wherein, the inlet defines a first width and the outlet defines a second width, the first width being greater than the second width, and the width of each of the plurality of grooves decreasingly tapers from the first width to the second width.

12. The disk assembly of claim 11, wherein the groove pattern forms a plurality of substantially V-shaped grooves between the first diameter and second diameter.

13. The disk assembly of claim 12, wherein each substantially V-shaped groove intersects with two or more other substantially V-shaped grooves.

14. The disk assembly of claim 11, wherein the second diameter is approximately aligned with the outer diameter.

15. The disk assembly of claim 11, wherein the friction material forms a plurality of substantially triangular and diamond-shaped portions between the plurality of grooves.

16. The disk assembly of claim 15, wherein at least one side of the plurality of substantially triangular portions coincides with either the first diameter or second diameter.

17. The disk assembly of claim 15, wherein the plurality of substantially diamond-shaped portions are spaced from the first diameter and second diameter.

18. The disk assembly of claim 11, further comprising an engaged condition and a disengaged condition, wherein:

in the engaged condition, the piston is in contact with one of the first and second plates and the disk is in contact with both plates; and in the disengaged condition, the disk is spaced between both plates.

19. A self-centering brake disk for a brake assembly, comprising:

an annular body having an inner diameter and an outer diameter;

a friction material coupled to the body and substantially covering at least one side thereof, the friction material forming a first diameter and a second diameter, where the first diameter is smaller than the second diameter; and a groove pattern defined in the friction material, the groove pattern including a plurality of grooves defined by a first set of grooves and a second set of grooves, the first set of grooves angularly disposed at an angle +Θ relative to a radial direction and the second set of grooves angularly disposed at an angle −Θ relative to the radial direction;

a groove inlet defined at the first diameter;

a groove outlet defined at the second diameter;

wherein, each of the first set of grooves intersects at least four different grooves of the second set of grooves to form four intersection points;

further wherein, the four intersection points include the groove inlet, the groove outlet, and at two locations between the groove inlet and groove outlet.

20. The self-centering brake disk of claim 19, wherein the groove inlet defines a first width and the groove outlet defines a second width, the first width being greater than the second width, and the width of each of the plurality of grooves continuously decreases from the first width to the second width.

* * * * *